Oct. 7, 1941.   C. E. BENNETT ET AL   2,257,727
METHOD OF FORMING DAMS
Filed March 4, 1939

INVENTORS
Charles E. Bennett,
BY Fred C. Meyer,
Kiddle, Bichell and Montgomery.
ATTORNEYS Patented Oct. 7, 1941

2,257,727

UNITED STATES PATENT OFFICE 2,257,727

METHOD OF FORMING DAMS

Charles E. Bennett, Ridgewood, and Fred C. Meyer, Wyckoff, N. J., assignors to The Okonite-Callender Cable Company, Incorporated, Paterson, N. J., a corporation of New Jersey Application March 4, 1939, Serial No. 259,778

6 Claims. (Cl. 62—170)

Our invention is directed to a method for forming dams in pipe lines, more specifically pipe lines containing oil or other liquid. Still more specifically the present invention provides for forming dams in pipe lines at relatively short intervals and so that tests may be made for leaks in the length or sections between blocks.

One of the advantages of our method resides in the fact that it is relatively inexpensive in that it becomes unnecessary to uncover long lengths of the line and no expensive equipment is necessary.

Broadly speaking, our invention comprehends the freezing of the oil in the pipe line at predetermined points in the line, thereby to block the line, so that the same can be tested for leaks intermediate these blocks or dams.

More specifically our invention comprehends a cooling down of the area to be blocked and then the introduction into this cooled area of a material having a pouring point higher than that of the now cooled material at the area to be blocked. We have found in some cases it may be advantageous to introduce a good thermal conductor into the pipe line at the area to be blocked, in which case it is not always essential to introduce the material above referred to.

Figure 1:
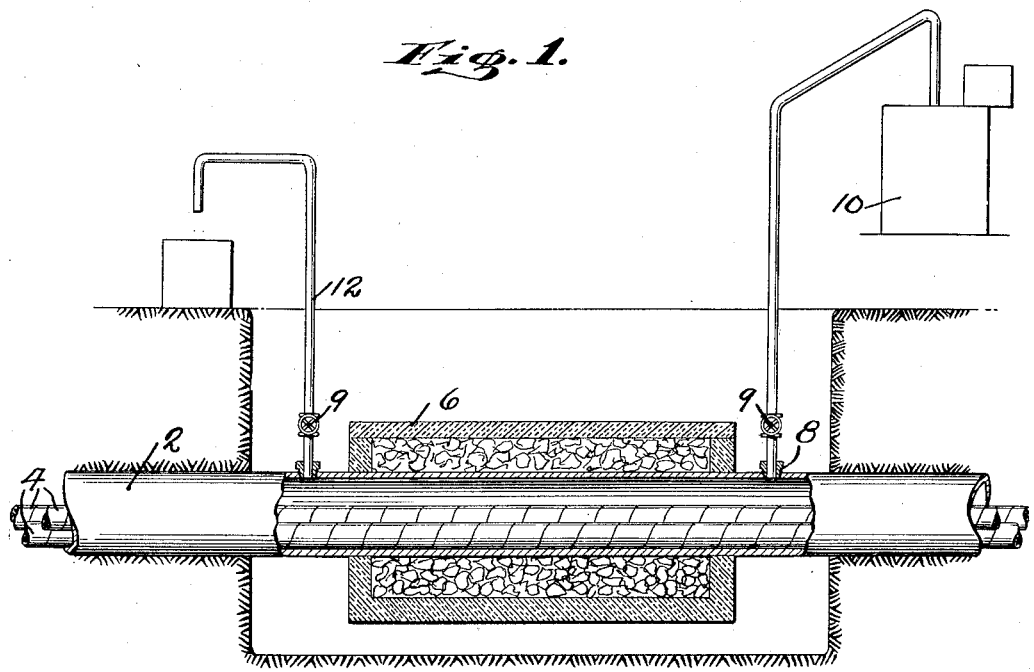
Fig. 1 is a part sectional side elevation of a pipe line showing one form of equipment adapted for practicing our invention.

Referring first of all to Fig. 1 of the drawing: 2 designates a pipe line buried in the earth. This line, we will assume, is filled with oil from a suitably located storage reservoir and if it should be the pipe line of a well known type of electric cable, it contains one or more insulated electric conductors 4 which have been drawn into the pipe line and the oil is under pressure.

The storage reservoir is equipped with suitable gauges and loss of oil in the storage reservoir denotes a leak in the pipe line. If more than one pipe line is fed from the reservoir it will be necessary to make a pressure drop test to determine which line is leaking. The leaking line will lose pressure much more rapidly than the others. Having determined which line is leaking, it becomes necessary to make a survey of the various sections of the line to determine which section is leaking. In making this survey it is customary to examine the ground for oil pools, loss of vegetation, etc. Having decided upon the approximate location of the leak, we excavate the section for a few feet at each side of the point where it is thought the leak is located.

A casing, such as that shown at 6, is then built around the pipe line at the excavated areas. These casings are heat insulated. We then fill the casings with a refrigerant such as ice and salt, for example, or with a mixture of gasoline and $CO_2$ ice. We find a satisfactory procedure is to fill or partially fill the casing with gasoline and then add $CO_2$ ice. In this way we are able to control the temperature of the refrigerant in the casing, from room temperature down to around $-70°$ C.

Then the equipment is allowed to stand for a short time, say for an hour, thoroughly to chill the oil in the line at the casings. It is important at this stage that the oil be chilled uniformly throughout the area to be blocked and that chilling be effected slowly, quick freezing tending to build up an insulating ring or annulus of frozen oil which prevents freezing of the oil at the center of the area to be blocked. We next introduce a compound into the area to be blocked, this compound having a pour point higher than that of the chilled oil. This compound which is prechilled is introduced at as low a temperature as possible, by the pressure gun shown diagrammatically at 10. This gun may be similar to the grease guns employed for chassis lubrication and be capable of developing pressures as high as 10,000 lbs. per square inch. The pipe line may be provided with vent pipes 12. The gun can be attached at 8, and valves 9 may be provided in the charging and vent lines. The introduction of the compound is preferably done in two stages. In other words, part of the compound is introduced, then the equipment is allowed to stand for a short time, before the remainder of the compound is introduced. When the mass at the areas to be blocked has frozen solid, then tests for leaks can be made between the dams or blocks. We have obtained good results where an 8⅝" OD pipe line containing three single conductor cables has been filled with 720 second viscosity oil (Saybolt Universal at 100° F.) with a pour point of $-20°$ F. and a compound such as a mixture of this same oil with rosin to raise its pour point to a temperature of 60° F. More specifically before the compound was introduced, the pipe was cooled for an hour, then some compound introduced and freezing continued for four more hours, after which more compound was introduced and freezing continued for several hours more, until the mass of oil surrounded by the casing 6 was frozen solid. About ten gallons of compound were employed and about twelve hours were required to effect a complete seal. By cooling or chilling the pipe line for some time before introducing the compound the oil in the pipe line at the area surrounded by the casing is thickened and will prevent dispersion of the compound in the oil of the pipe line except at the site at which the dam or block is to be formed.

The compound may be removed after completion of the operation by slight heating to drive off the compound through the vent pipe 12, simply by closing the valve 9 in the line from the pressure gun and opening the valve 9 in the vent 12.

There is considerable flexibility in our method so far as selection of compound is concerned. For example, instead of employing the compound above mentioned, we may use a compound which is a mixture of 95% rosin and 5% oil of say 3000 seconds viscosity (Saybolt Universal at 100° F.) which is frozen solid at 150° F.

Figure 2:
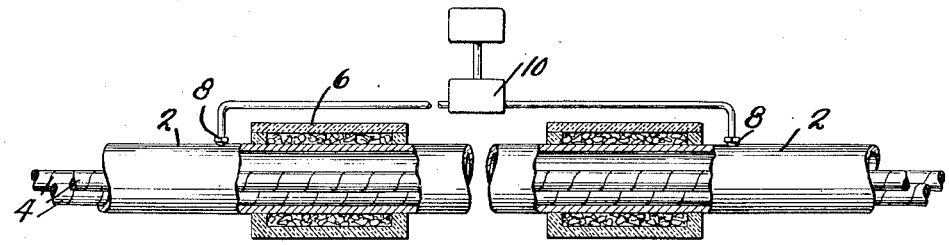
Fig. 2 is a similar view showing another form of equipment.

In Fig. 2 we have shown a modified form of equipment in that the pressure gun 14 which corresponds to the gun 10 of Fig. 1 serves to introduce compound into the pipe line 2 simultaneously at two separated points.

Figure 3:
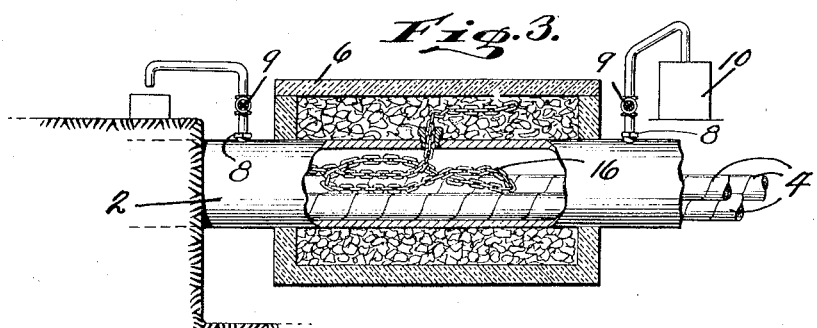
Fig. 3 is a similar view showing still another form of equipment.

We have found that the process is considerably speeded up if a thermal conducting material is introduced into the pipe line at the site of the dam. In such event it is not always essential to introduce the compound such as referred to in connection with our description of Fig. 1. Such a variation or modification is useful with large diameter pipes where some difficulty may be experienced due to the oil freezing adjacent the pipe and acting as an insulator to prevent freezing of the oil nearer the center. In this connection, and with reference to Fig. 3, before the casing 6 is placed in position a copper chain 16, for example, is placed in the pipe line and fairly well fills the pipe line at the dam site. The outer end of the chain is allowed to extend into the refrigerant in the casing 6. This arrangement provides a good thermal conducting path and materially shortens the freezing operation. Conductors other than the chain may be employed such as a flexible stranded conductor, woven wire or other flexible metallic conductor. On the other hand, flexible tubes may be inserted in the oil and a freezing mixture circulated through them.

It will be seen from all of the foregoing that our invention provides a process whereby dams or blocks may be readily frozen into a pipe line at desired intervals to promote the locating of leaks in the pipe line.

It is to be understood that changes may be made in the process described without departing from the spirit and scope of the invention.

What we claim is:

1. The process of forming a dam in a pipe line containing a liquid, which process comprises introducing a compound into the pipe line at the site of the desired dam, the compound having a pour point higher than that of the liquid, and freezing the mixture of liquid and compound in situ.

2. The process of forming a dam in an oil-containing pipe line, which process comprises introducing a compound into the pipe line at the desired site of the dam, the compound having a pour point higher than that of the oil, and freezing the mixture of oil and compound in situ.

3. The process of forming a dam in an oil-containing pipe line, which process comprises chilling the oil in the pipe line at a predetermined site, until substantially all of the oil at the site is chilled, then introducing a compound into the chilled oil, the compound having a pour point which is higher than the oil, and then freezing the mixture of oil and compound in situ.

4. The process of forming a dam in an oil-containing pipe line, which process comprises packing a refrigerant about the pipe line at the desired site of the dam, to effect transfer of heat from the oil in the pipe line at said site, thereby to chill the oil, introducing a compound into this chilled oil, the compound having a pour point higher than that of the oil, and then freezing the mixture of oil and compound in situ into a solid mass.

5. The process of forming a dam in an oil-containing pipe line, which process comprises circulating a refrigerant through the oil in the pipe line at a predetermined site in the pipe line to chill the oil at this site, introducing a compound into the chilled oil, the compound having a pour point higher than the oil, and then freezing the mixture of oil and compound in situ.

6. The process of forming a dam in an oil-containing pipe line, which process comprises introducing a tube within the pipe line at a predetermined site in the pipe line, circulating a refrigerant through the tube, to chill the oil, introducing into the chilled oil a compound having a pour point higher than the oil, and freezing the mixture of oil and compound in situ.

CHARLES E. BENNETT.
FRED C. MEYER.